United States Patent [19]

Ryang

[11] Patent Number: 4,797,454
[45] Date of Patent: Jan. 10, 1989

[54] CURABLE RESIN SYSTEMS CONTAINING CYANATE ESTER FUNCTIONAL OXAZOLINYLPOLYSILOXANES

[75] Inventor: Hong-Son Ryang, Camarillo, Calif.

[73] Assignee: BASF Corporation, Parsippany, N.J.

[21] Appl. No.: 100,652

[22] Filed: Sep. 24, 1987

[51] Int. Cl.$^4$ .......................................... C08F 283/00
[52] U.S. Cl. ..................................... 525/476; 528/26; 528/28; 525/479; 525/101; 525/103
[58] Field of Search .................. 528/28, 26; 525/479, 525/476, 103, 101

[56] References Cited

U.S. PATENT DOCUMENTS

| 3,448,879 | 6/1969 | Grigat et al. | 260/59 |
| 3,553,244 | 1/1971 | Grigat et al. | 260/453 |
| 4,636,542 | 1/1987 | Hefner et al. | 528/104 |
| 4,663,398 | 5/1987 | Hefner, Jr. | 260/453 |

Primary Examiner—Melvyn I. Marquis
Attorney, Agent, or Firm—William G. Conger

[57] ABSTRACT

Cyanate-functional oxazolinylpolysiloxanes are useful for toughening high performance resin systems such as cyanates, epoxies, and bismaleimides without substantial loss of heat resistance.

13 Claims, No Drawings

CURABLE RESIN SYSTEMS CONTAINING CYANATE ESTER FUNCTIONAL OXAZOLINYLPOLYSILOXANES

BACKGROUND OF THE INVENTION

1. Field of the Invention

The subject invention relates to high performance thermosetting resin systems. More particularly, the subject invention relates to heat-curable resin systems containing cyanate ester-functional oxazolinylpolysiloxanes.

2. Description of the Related Art

High performance thermosetting resins based upon cyanate esters find application in many areas where high strength and heat resistance are important. Such resins, which contain monomers having two or more cyanate ester (cyanate) groups, polymerize to form highly cross-linked triazine structures. Unfortunately, the high strength and heat resistance which results from the polymer structure also causes the polymer to be brittle, and subject to impact induced damage.

Modification of these resin systems to improve their flexibility and reduce susceptibility to impact induced damage has been but partially successful. Copolymerization with epoxy resins, bismaleimide resins, and modification with cyanate-reactive acrylonitrile-butadiene elastomers have imparted greater toughness to cyanate resin systems, but generally with considerable loss of heat resistance.

SUMMARY OF THE INVENTION

It has now been discovered that cyanate resins and other resin systems may be successfully modified through incorporation of a cyanate-functional oxazolinylpolysiloxane into the resin system. The resulting toughened resin systems show a considerable increase in flexibility without a concomitant decrease in heat resistance.

DESCRIPTION OF THE PREFERRED EMBODIMENTS

The cyanate-functional oxazolinylpolysiloxanes of the subject invention are readily prepared by the catalyzed or uncatalyzed reaction of at least a molar equivalent of a di- or polycyanate functional monomer with an epoxy-functional polysiloxane.

phenols which are commonly used to prepare the cyanate resins include mononuclear phenols such as hydroquinone and resorcinol; the various bisphenols, i.e. bisphenol A, bisphenol F and bisphenol S; and the various phenol and cresol based novolac resins. Examples of the method of preparation and of specific cyanate functional monomers may be found in U.S. Pat. Nos. 3,448,079, 3,553,244 and 4,663,398. Particularly preferred are the cyanates of hydroquinone, bisphenol A, bisphenol F, 2,2',6,6'-tetramethylbisphenol F, bisphenol S, and the phenolic novolac resins, and the di- and polyphenols which are derived from the reaction products of phenol and dicyclopentadiene in the presence of Friedel-Crafts catalysts as disclosed in U.S. Pat. No. 3,536,734, hereinafter referred to as phenolated dicyclopentadiene. The cyanate functional resins are generally used in an amount at least equivalent to the number of moles of epoxy groups in the epoxy-functional siloxane and preferably in excess. For example, to one mole of a linear siloxane or polysiloxane terminated at both ends with epoxy functionality will be added two moles or more of a dicyanate. The amount of excess cyanate may be adjusted depending upon the particular application or the degree of toughness required.

The epoxy-terminated siloxanes may be prepared by methods well known to those skilled in the art. See, for example, J. Riffle, et. al., *Epoxy Resin Chemistry II*, ACS Symposium Series No. 221, American Chemical Society, pp. 24–25. Generally speaking, the epoxy functional polysiloxanes are prepared by the equilibrium polymerization of the readily available bis (3-glycidoxypropyl)tetramethyldisiloxane with a cyclic siloxane oligomer, preferably octamethylcyclotetrasiloxane or octaphenylcyclotetrasiloxane.

The equilibrium polymerization generally proceeds in the presence of a catalyst such a tetramethylammonium or tetrabutylammonium hydroxide or the corresponding siloxanolates. Particularly preferred is tetramethylammonium siloxanolate. The reaction proceeds readily at temperatures from about 50° C. to about 200° C., preferably from about 80° C. to about 150° C.

Reaction of the cyanate-functional monomer with the epoxy-functional siloxane occurs at elevated temperatures, e.g. from about 80° C. to about 250° C., preferably from about 130° C. to about 210° C. to yield a cyanate-functional oxazolinylpolysiloxane. The reaction sequence may be illustrated as follows:

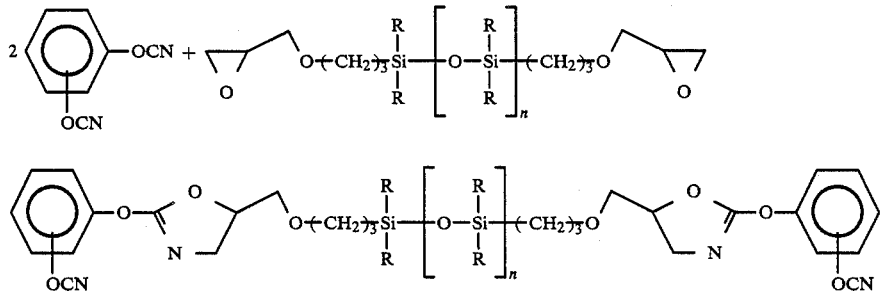

In the claims, the term "polycyanate" shall include dicyanates as well as cyanate-functional monomers containing more than two cyanate groups.

The cyanate-functional monomers are well known to those skilled in the art. These monomers are generally prepared by reacting a cyanogen halide with a di- or polyhydric phenol or similar compound. Examples of wherein each R may be, for example, a $C_1$–$C_6$ lower alkyl, $C_1$–$C_6$ lower alkoxy, $C_1$–$C_6$ haloalkyl, vinyl, allyl, allyloxy, propenyl, propenyloxy, acetoxy, $C_5$–$C_{10}$ cycloalkyl, or aryl radical.

Catalysts are not necessary for the reaction between the cyanate monomer and the epoxy-functional polysiloxane. However, if desirable, metal catalysts such as tin octoate, dibutyltindilaurate, dibutyltindiacetate, or compounds of lead or zinc which catalyze triazine formation from cyanates may be used. Other catalysts which may be useful include metal acetylacetonates, metal alkyls such as butyl titanate and propyl aluminum, metal chlorides such as tin(IV) chloride; imidazoles, particularly 2-substituted and 2,4-disubstituted imidazoles, and tertiary amines such as N,N-dimethylbenzylamine, triethylenediamine, N-methylmorpholine and the like. The catalysts, when utilized, are generally present to the extent of from about $1.0 \times 10^{-6}$ to about 2.0 wt. percent, preferably from about $1.0 \times 10^{-3}$ to about 0.5 weight percent, and most preferably from about $1.0 \times 10^{-2}$ to about 0.5 weight percent.

The examples which follow illustrate the practice of the subject invention. These examples are by way of illustration only, and should not be interpreted as limiting the scope of the invention in any way.

EXAMPLE 1

Preparation of Tetramethylammonium Siloxanolate

Into a 250 ml three neck round bottom flask equipped with a mechanical stirrer and reflux condenser are placed 118.6 g (0.4 mol) octamethylcyclotetrasiloxane and 18.6 g (0.1 mol) tetramethylammonium hydroxide pentahydrate. The mixture is stripped of water over a period of 48 hours by means of a flow of nitrogen while stirring at 70° C. The resulting viscous syrup is used as a polymerization catalyst without further purification.

EXAMPLE 2

Preparation of Epoxy-Functional Polysiloxane Copolymer

To a 2 liter three neck round bottom flask equipped with a mechanical stirrer and reflux condenser are charged 534.4 g octamethylcyclotetrasiloxane, 534.4 g octaphenylcyclotetrasiloxane, 90.7 g bis[3-glycidoxypropyl]tetramethyldisiloxane, and 12.0 g tetramethylammonium siloxanolate from Example I. The resulting mixture is stirred at 80° C. for 48 hours under nitrogen. During this period, the viscosity is observed to increase and then reach a stable value. The catalyst is then destroyed by heating to 150° C. for 4 hours. After cooling to room temperature, the filtered reaction mixture is extracted twice with methanol (300 ml×2) to remove unreacted cyclic oligomers. The product is then dried in vacuo at 1 torr and 150° C. The product is a viscous oil (1100 g) having an epoxy equivalent weight (EEW) of 1210.

Example 3

Preparation of Epoxy-Functional Polydimethylsiloxane

Using the procedure of Example 2, a reactor is charged with 18.3 g bis[3-glycidoxypropyl]tetramethyldisiloxane, 182.0 g octamethylcycloetrasiloxane, and 1.4 g tetramethylammonium siloxanolate. The product is a colorless, viscous oil (180 g, EEW =2200).

Example 4

Heat-Curable Resin Adhesive

A heat-curable resin adhesive composition is prepared by mixing 20.0 g of the epoxy-functional polysiloxane from Example 2 with 180.0 g 2,2',6,6'-tetramethylbisphenol F dicyanate in a 500 ml glass reactor. The mixture is heated, with vigorous stirring, to 190° C. and maintained at that temperature for 5 hours under nitrogen. After cooling to 70° C., 5.25 g of fumed silica (CAB-O-SIL ® M-5, a product of the Cabot Corporation), 0.6 g copper acetylacetonate and 8.0 g of a novolac epoxy resin (DEN ® 31, a product of the Dow Chemical Company) are added. The homogenous mixture is coated on a 112 fiberglass carrier.

Comparison Example A

Heat-Curable Resin Adhesive

A resin composition similar to that of example 4, but without the cyanate-functional oxazolinylpolysiloxane modifier, is prepared by admixing 180 g 2,2',6,6'-tetramethylbisphenol F dicyanate, 5.25 g CAB-O-SIL ® M-5, 0.6 g copper acetylacetonate, and 8.0 g DEN ® 431.

The adhesives prepared in Example 4 and Comparison Example A are used to bond aluminum sheets. The resins are cured by heating for 4 hours at 177° C., 2 hours at 220° C. and 1 hour at 250° C. Single lap shear strengths are measured by ASTM method D-1002. Results are presented in Table I below.

TABLE I

| Adhesive Formulation | Single Lap Sheer Strength (psi) | |
|---|---|---|
| | 20° C. | 177° C. |
| Example 4 | 3100 | 3300 |
| Comparison Example A | 2000 | 2510 |

Example 5

Heat-Curable Modified Bismaleimide Resin Adhesive

A heat-curable bismaleimide adhesive composition is prepared by first admixing 10.0 g of the epoxy-functional polysiloxane of Example 2 with 70.0 g 2,2',6,6'-tetramethylbisphenol F dicyanate in a 500 ml reactor. After heating at 190° C. for 5 hours with vigorous stirring, the mixture is cooled to 150° C. and 10.0 g of the bismaleimide of 4,4'-diaminodiphenylmethane is added. After stirring for 30 minutes, the mixture is allowed to cool to 70° C. and 3.2 g CAB-O-SIL ® M-5, 0.43 g zinc naphthenate, and 2.0 g benzylalcohol are added. After coating onto a 112 glass fabric, the adhesive is used to bond aluminum. The cure cycle is identical to that used previously for Example 4 and Comparison Example A. Single lap shear strength (ASTM 1002) are as follows:

TABLE II

| Temp | Shear Strength (psi) |
|---|---|
| 20° C. | 2890 |
| 177° C. | 3060 |
| 205° C. | 3270 |

Example 6

Heat-Curable Resin Formulation

A heat-curable cyanate resin formulation is prepared by stirring together 6 g of bisphenol A dicyanate and 16.0 g of the epoxy functional silicone of Example 3 at 150° C. under nitrogen for 5 hours. To the resulting homogenous but opaque mixture is added 0.079 g zinc octoate. The resulting mixture is cured at 177° C. for 4 hours, then 205° C. for an additional 4 hours. The resin showed good adhesion to both aluminum and glass. Thermogravimetric Analysis (TGA) of the cured elastomer and of cured bisphenol A dicyanate are presented in Table III which indicates that despite large quantities of modifier, the finished elastomer has virtually the same heat resistance as the polymerized cyanate resin itself.

TABLE III

| Resin | TGA (°C.) in Air | |
|---|---|---|
|  | 5% Wt. Loss | 10% Wt. Loss |
| Modified Cyanate of Example 6 | 430 | 440 |
| Bisphenol A dicyanate | 440 | 445 |

The cyanate-functional oxazolinylpolysiloxane modifiers of the subject invention may be used to toughen a number of high performance resin systems. Due to the variety of reactions in which the cyanate radical may take part, these modifiers may be used, for example, in epoxy resin systems, cyanate resin systems, and bismaleimide resin systems, to name a few. Such resin systems are well known to those skilled in the art.

The toughened resin systems find use as laminating resins, as matrix resins in high performance, fiber reinforced prepregs, as potting and encapsulating resins, and as structural adhesives. When used in prepregs, traditional fiber reinforcement such as carbon/graphite, fiberglass, boron, and other fibers may be used in woven or non-woven form, as a mat, or as collimated fiber tows. Rovings and yarns may also be used. The use of such fiber reinforcement is commonplace in the aerospace and transportation industries.

The embodiments of the invention in which an exclusive privilege or property is claimed are defined as follows:

1. A cyanate-functional oxazolinylpolysiloxane modifier for heat curable resins which comprises the reaction product of an epoxy-functional polysiloxane and a polycyanate-functional monomer.

2. The modifier of claim 1 wherein said epoxy functional polysiloxane is a bis[3-glycidoxypropyl]polysiloxane.

3. The modifier of claim 1 wherein the mole ratio of cyanate groups in the polycyanate functional monomer to epoxy groups in the epoxy-functional polysiloxane is at least 2:1.

4. The modifier of claim 2 wherein the mole ratio of cyanate groups in the polycyanate functional monomer to epoxy groups in the epoxy-functional polysiloxane is at least 2:1.

5. The modifier of claim 2 wherein said epoxyfunctional polysiloxane corresponds to the formula:

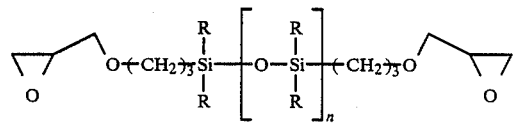

wherein each R is individually selected from the group consisting of $C_1$–$C_6$ lower alkyl, $C_1$–$C_6$ lower alkoxy, $C_1$–$C_6$ haloalkyl, vinyl, allyl, allyloxy, propenyl, propenyloxy, acetoxy, $C_5$–$C_{10}$ cycloalkyl, and aryl radicals and wherein n is an integer from 1 to about 10,000.

6. The modifier of claim 5 wherein each R is individually selected from the group consisting of methyl and phenyl radicals.

7. The modifier of claim 1 wherein said polycyanate-functional monomer is a dicyanate.

8. The modifier of claim 7 wherein said dicyanate is selected from the group consisting of the cyanates of hydroquinone, bisphenol A, bisphenol F, bisphenol S, 2,2',6,6'-tetramethylbisphenol F, and phenolated dicyclopentadiene.

9. The modifier of claim 2 wherein said polycyanate-functional monomer is a dicyanate.

10. The modifier of claim 9 wherein said dicyanate is selected from the group consisting of the cyanates of hydroquinone, bisphenol A, bisphenol F, bisphenol S, 2,2',6,6'-tetramethylbisphenol F, and phenolated dicyclopentadiene.

11. A process for toughening a heat-curable resin comprising adding thereto a toughening amount of the cyanate-functional oxazolinylpolysiloxane of claim 1.

12. The process of claim 11 wherein said heat-curable resin is selected from the group consisting of cyanate-functional resins, epoxy resins, bismaleimide resins, and mixtures thereof, wherein the term cyanate-functional resin excludes the cyanate-functional oxazolinylpolysiloxanes.

13. A polysiloxane elastomer of the cyanate-functional oxazolinylpolysiloxane of claim 1.

* * * * *